(12) United States Patent
Woodward (10) Patent No.: US 6,934,682 B2
(45) Date of Patent: Aug. 23, 2005

(54) PROCESSING SPEECH RECOGNITION ERRORS IN AN EMBEDDED SPEECH RECOGNITION SYSTEM

(75) Inventor: Steven G. Woodward, Boca Raton, FL (US)

(73) Assignee: International Business Machines Corporation, Armonk, NY (US)

(*) Notice: Subject to any disclaimer, the term of this patent is extended or adjusted under 35 U.S.C. 154(b) by 557 days.

(21) Appl. No.: 09/798,636

(22) Filed: Mar. 1, 2001

(65) Prior Publication Data

US 2002/0123893 A1 Sep. 5, 2002

(51) Int. Cl.[7] .............................................. G10L 17/00
(52) U.S. Cl. ....................... 704/250; 704/252; 704/235
(58) Field of Search ................................ 704/235, 231, 704/252, 240, 250, 251, 256; 434/156, 157; 382/186, 187

(56) References Cited

U.S. PATENT DOCUMENTS 5,794,189 A * 8/1998 Gould ......................... 704/231
5,829,000 A * 10/1998 Huang et al. ................ 704/252
6,173,259 B1 * 1/2001 Bijl et al. .................... 704/235
6,366,882 B1 * 4/2002 Bijl et al. .................... 704/235
6,418,410 B1 * 7/2002 Nassiff et al. ............... 704/251
6,463,413 B1 * 10/2002 Applebaum et al. ........ 704/256

* cited by examiner

Primary Examiner—Susan McFadden
Assistant Examiner—Huyen X. Vo
(74) Attorney, Agent, or Firm—Akerman Senterfitt (57) ABSTRACT

A method and system for processing speech misrecognitions. The system can include an embedded speech recognition system having at least one acoustic model and at least one active grammar, wherein the embedded speech recognition system is configured to convert speech audio to text using the at least one acoustic model and the at least one active grammar; a remote training system for modifying the at least one acoustic model based on corrections to speech misrecognitions detected in the embedded speech recognition system; and, a communications link for communicatively linking the embedded speech recognition system to the remote training system. The embedded speech recognition system can further include a user interface for presenting a dialog for correcting the speech misrecognitions detected in the embedded speech recognition system. Notably, the user interface can be a visual display. Alternatively, the user interface can be an audio user interface. Finally, the user interface can include both a visual display and an audio user interface.

17 Claims, 6 Drawing Sheets

PROCESSING SPEECH RECOGNITION ERRORS IN AN EMBEDDED SPEECH RECOGNITION SYSTEM

BACKGROUND OF THE INVENTION

1. Technical Field

This invention relates to the field of embedded speech recognition systems and more particularly to processing speech recognition errors in an embedded speech recognition system.

2. Description of the Related Art

Speech recognition is the process by which an acoustic signal received by microphone is converted to a set of text words by a computer. These recognized words may then be used in a variety of computer software applications for purposes such as document preparation, data entry, and command and control. Speech recognition systems programmed or trained to the diction and inflection of a single person can successfully recognize the vast majority of words spoken by that person.

In operation, speech recognition systems can model and classify acoustic signals to form acoustic models, which are representations of basic linguistic units referred to as phonemes. Upon receipt of the acoustic signal, the speech recognition system can analyze the acoustic signal, identify a series of acoustic models within the acoustic signal and derive a list of potential word candidates for the given series of acoustic models. Subsequently, the speech recognition system can contextually analyze the potential word candidates using a language model as a guide.

The task of the language model is to express restrictions imposed on the manner in which words can be combined to form sentences. The language model can express the likelihood of a word appearing immediately adjacent to another word or words. Language models used within speech recognition systems typically are statistical models. Examples of well-known language models suitable for use in speech recognition systems include uniform language models, finite state language models, grammar based language models, and m-gram language models.

Notably, the accuracy of a speech recognition system can improve as the acoustic models for a particular speaker are refined during the operation of the speech recognition system. That is, the speech recognition system can observe speech dictation as it occurs and can modify the acoustic model accordingly. Typically, an acoustic model can be modified when a speech recognition training program analyzes both a known word and the recorded audio of a spoken version of the word. In this way, the speech training program can associate particular acoustic waveforms with corresponding phonemes contained within the spoken word.

In a traditional computing systems in which speech recognition can be performed, extensive training programs can be used to modify acoustic models during the operation of speech recognition systems. Though time consuming, such training programs can be performed efficiently given the widely available user interface peripherals which can facilitate a user's interaction with the training program. In an embedded computing device, however, typical personal computing peripherals such as a keyboard, mouse, display and graphical user interface (GUI) often do not exist. As such, the lack of a conventional mechanism for interacting with a user can inhibit the effective training of a speech recognition system because such training can become tedious given the limited ability to interact with the embedded system. Yet, without an effective mechanism for training the acoustic model of the speech recognition system, when a speech recognition error has occurred, the speech recognition system cannot appropriately update the corresponding speech recognition system language model so as to reduce future instances of future misrecognitions.

SUMMARY OF THE INVENTION

The present invention solves the problem of processing speech misrecognized in an embedded speech recognition system. Specifically, the present invention can include a method performed in a remote training system. More particularly, the method can process a speech misrecognition generated when converting speech audio to text in an embedded speech recognition system. The method can include the following steps: First, speech audio and an active acoustic model both associated with a speech misrecognition detected in the embedded speech recognition system can be received from the embedded speech recognition system. Second, a first list of valid phrases can be presented which were contextually valid when the speech misrecognition occurred. Moreover, a second list of words can be presented which form a selected one of the first presented contextually valid phrases. Third, the active acoustic model can be modified based on selected ones of the words in the list and the received speech audio. Finally, the modified acoustic model can be transmitted to the embedded speech recognition system.

Notably, the method can further include receiving an active grammar from the embedded speech recognition system, wherein the active acoustic model is modified based on the active grammar in addition to the selected words and the received speech audio. Significantly, the first presenting step can include visually presenting the list of contextually valid phrases in a user interface. Alternatively, the first presenting step can include audibly presenting the list of contextually valid phrases. The step of audibly presenting the list can include text-to-speech (TTS) converting the list of contextually valid phrases; and, audibly presenting the TTS converted list. Finally, the first presenting step can include both visually and audibly presenting the list of contextually valid phrases.

A system for processing speech misrecognitions in accordance with the inventive arrangements can include an embedded speech recognition system having at least one acoustic model and at least one active grammar, wherein the embedded speech recognition system is configured to convert speech audio to text using at least one acoustic model and at least one active grammar; a remote training system for modifying at least one acoustic model based on corrections to speech misrecognitions detected in the embedded speech recognition system; and, a communications link for communicatively linking the embedded speech recognition system to the remote training system. The embedded speech recognition system can further include a user interface for presenting a dialog for correcting the speech misrecognitions detected in the embedded speech recognition system. Notably, the user interface can be a visual display. Alternatively, the user interface can be an audio user interface. Finally, the user interface can include both a visual display and an audio user interface.

BRIEF DESCRIPTION OF THE DRAWINGS

There are presently shown in the drawings embodiments which are presently preferred, it being understood, however.

DETAILED DESCRIPTION OF THE INVENTION

The present invention is a system and method for remotely processing misrecognized speech generated when converting speech audio to text in an embedded speech recognition system. As used herein, an embedded speech recognition system refers to a speech recognition system that is bound in a functionally fixed manner within specific hardware; hardware which is not designed to be re-purposed by a user, meaning that a user should not "delete" speech recognition software from the hardware device in order to use the device for a purpose unrelated to speech recognition. That is, an embedded speech recognition system utilizes specialized hardware for performing speech recognition tasks. The embedded speech recognition system can be an integrated part of a stand-alone computing device, such as a mobile dictation device.

It should be noted that embodiments exist where the embedded speech recognition system can receive external input and where firmware updates can be applied to the embedded speech recognition system. Such actions are not to be construed as "re-purposing" the embedded speech recognition system, for purposes of the invention detailed herein.

Figure 1:
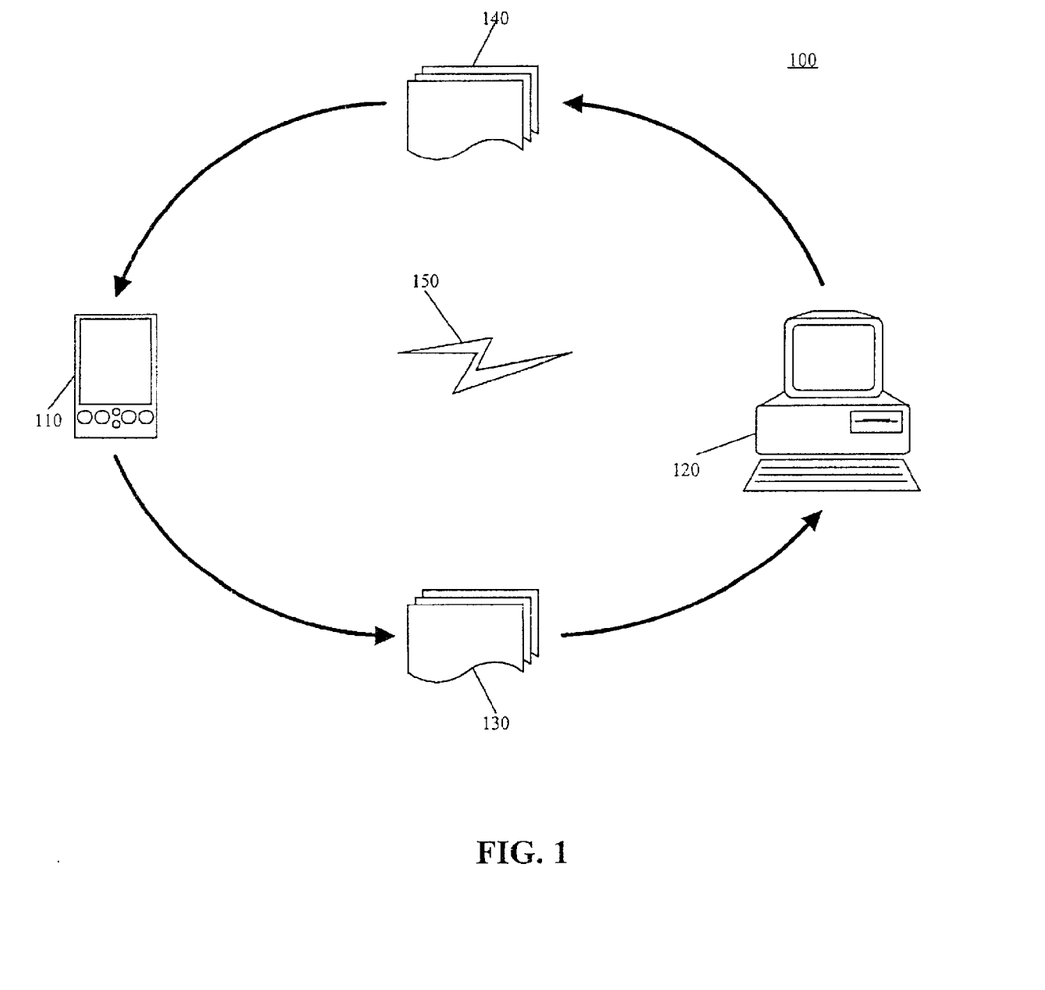
FIG. 1 is a schematic illustration of an embedded speech recognition system communicatively linked to remote speech training system.

FIG. 1 is a schematic illustration illustrating the interaction between an embedded speech recognition system 110 and a remote training system 120, both configured in accordance with the inventive arrangements. As shown in FIG. 1, the method can include detecting a speech misrecognition in the embedded speech recognition system 110. Misrecognized speech can refer to speech recognized text which does not match the actual audio input provided by the speaker. An example of misrecognized speech can include the speech recognized text, "time" resulting from the speaker provided audio input, "climate". Upon detecting a speech misrecognition, both the speech audio associated with the misrecognized and the active acoustic model 130 can be transmitted to the remote training system 120. Subsequently, the remote training system 120 can use the speech audio in a process for modifying the acoustic model. Once modified, the improved acoustic model 140 can be transmitted back to the embedded speech recognition system 110.

As shown in FIG. 1, the embedded speech recognition system 110 and the remote training system 120 can communicate through communications link 150. Communications link can be any suitable communications system, including both wireless or wireline technologies. Examples of wireless technologies can include line-of-sight technologies such as infrared, radio frequency communications, including cellular, as well as short-range radio frequency communications technologies, such as Bluetooth™ technology from the Bluetooth Special Interest Group. Examples of wireline technologies can include direct cable technologies such as USB, and serial communications, as well as communications network technologies such as Ethernet.

Figure 2:
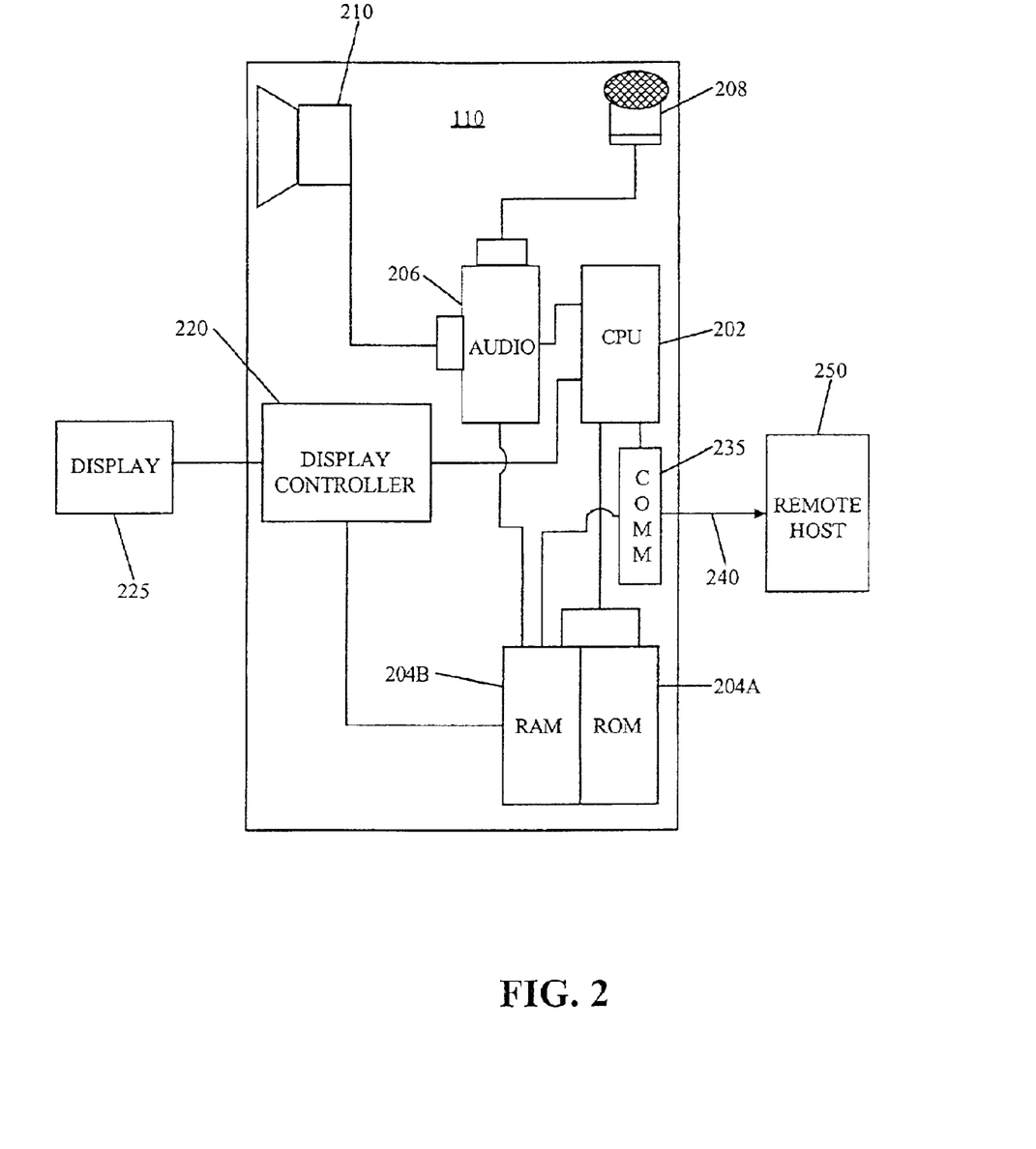
FIG. 2 is a schematic illustration of an embedded speech recognition system configured in accordance with one aspect of the inventive arrangements.

FIG. 2 shows an embedded speech recognition system 110 suitable for use with the present invention. The embedded speech recognition system 110 preferably is comprised of an embedded computing device including a central processing unit (CPU) 202, one or more memory devices and associated circuitry 204A, 204B. The embedded speech recognition system 110 also can include an audio input device such as a microphone 208 and an audio output device such as a speaker 210, both operatively connected to the computing device through suitable audio interface circuitry 206. The CPU 202 can be comprised of any suitable microprocessor or other electronic processing unit, as is well known to those skilled in the art. Memory devices can include both non-volatile memory 204A and volatile memory 204B. Examples of non-volatile memory can include read-only memory and flash memory. Examples of non-volatile memory can include random access memory (RAM). The audio interface circuitry 206 can be a conventional audio subsystem for converting both analog audio input signals to digital audio data, and also digital audio data to analog audio output signals.

In one aspect of the present invention, a display 225 and corresponding display controller 220 can be provided. The display 225 can be any suitable visual interface, for instance an LCD panel, LED array, CRT, etc. In addition, the display controller 220 can perform conventional display encoding and decoding functions for rendering a visual display based upon digital data provided in the embedded speech recognition system 110. Still, the invention is not limited in regard to the use of the display 225 to present visual feedback to a speaker. Rather, in an alternative aspect, an audio user interface (AUI) can be used to provide audible feedback to the speaker in place of the visual feedback provided by the display 225 and corresponding display controller 220. Moreover, in yet another alternative aspect, feedback can be provided to the speaker through both an AUI and the display 225.

Figure 3:
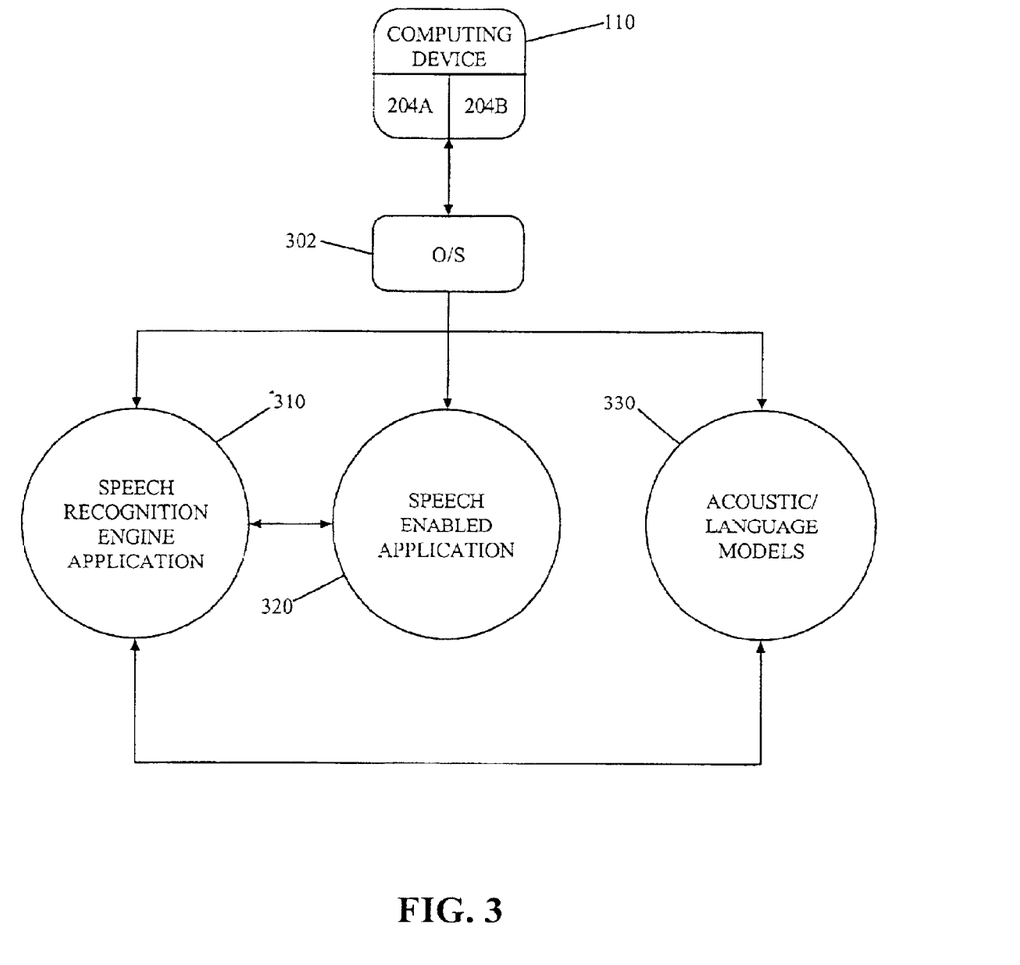
FIG. 3 is a block diagram illustrating an architecture for use in the embedded computing device of FIG. 1.

FIG. 3 illustrates an exemplary high level architecture for the embedded speech recognition system 110 of FIG. 1. As shown in FIG. 3, an embedded speech recognition system 110 for use with the invention typically can include an operating system 302, a speech recognition engine 310, a speech enabled application 320, and acoustic models/language models 330 for use by the speech recognition engine 310. Notably, acoustic models 330 can include phonemes which can be used by the speech recognition engine 310 to derive a list of potential word candidates from an audio speech signal.

Significantly, in FIG. 3, the speech recognition engine 310, speech enabled application 320 and acoustic/language models 330 are shown as separate application programs. It should be noted however that the invention is not limited in this regard, and these various application programs could be implemented as a single, more complex applications program. For example the speech recognition engine 310 could be combined with the speech enabled application 320.

Referring now to both FIGS. 2 and 3, during a speech recognition session, speech audio signals representative of sound received in microphone 208 are processed by CPU 202 within the embedded speech recognition system 110 using audio circuitry 206 so as to be made available to the operating system 302 in digitized form. The speech audio signals received by the embedded speech recognition system 110 are conventionally provided to the speech recognition engine 310 via the computer operating system 302 in order to perform speech-to-text conversions on the speech audio signals which can produce speech recognized text. In sum, as in conventional speech recognition systems, the audio signals are processed by the speech recognition engine 310 using acoustic models 330 to identify words spoken by a user into microphone 208.

Once speech audio signals representative of speech have been converted to speech recognized text by the speech recognition engine 310, the speech recognized text can be provided to the speech enabled application 320 for further processing. Examples of speech enabled applications can include a speech-driven command and control application, or a speech dictation system, although the invention is not limited to a particular type of speech enabled application. The speech enabled application, in turn, can present the speech recognized text to the user through a user interface. For example, the user interface can be a visual display screen, an LCD panel, a simple array of LEDs, or an AUI which can provide audio feedback through speaker 210.

In any case, responsive to the presentation of the speech recognized text, a user can determine whether the speech recognition engine 310 has properly speech-to-text converted the user's speech. In the case where the speech recognition engine 310 has improperly converted the user's speech into speech recognized text, a speech misrecognition is said to have occurred. Importantly, where the user identifies a speech misrecognition, the user can notify the speech recognition engine 310. Specifically, in one aspect of the invention, the user can activate an error button which can indicate to the speech recognition engine that a misrecognition has occurred. However, the invention is not limited in regard to the particular method of notifying the speech recognition engine 310 of a speech misrecognition. Rather, other notification methods, such as providing a speech command can suffice.

Responsive to receiving a misrecognition error notification, the speech recognition engine 310 can transmit the original speech audio signal which had been misrecognized, and the active acoustic model to the remote training system 120. Additionally, the active language model also can be transmitted to the remote training system 120. Subsequently, the remote training system can process the speech audio signal and the active acoustic model to modify the acoustic model in a speech training session.

Figure 4:
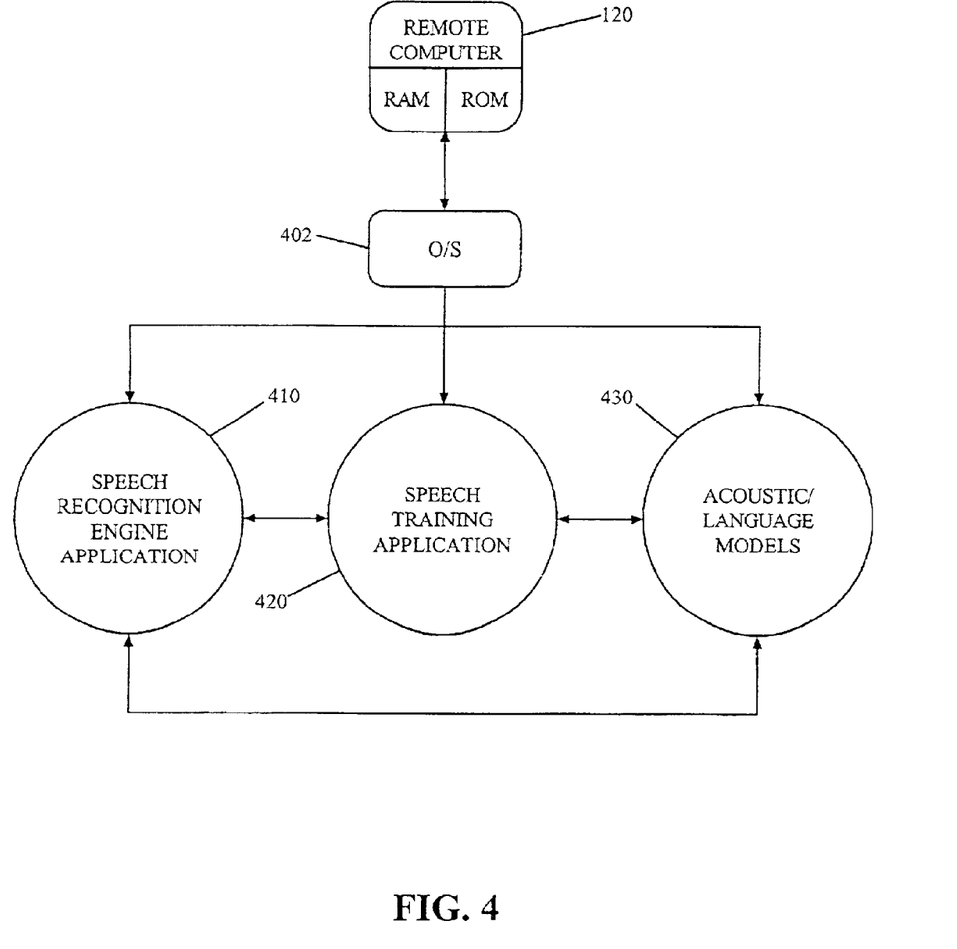
FIG. 4 is a block diagram illustrating an architecture for use in the speech training system of FIG. 1.

FIG. 4 illustrates an exemplary high level architecture for the speech training system 120 of FIG. 1. As shown in FIG. 4, a speech training system 120 for use with the invention typically can include an operating system 402, a speech recognition engine 410, a speech training application 420, and acoustic models/language models 430 for use by the speech recognition engine 410 and for modification by the speech training application 420. As in the case of FIG. 3, in FIG. 4 the speech recognition engine 410, speech training application 420 and acoustic/language models 430 are shown as separate application programs. It should be noted however that the invention is not limited in this regard, and these various application programs could be implemented as a single, more complex applications program.

In operation, during a remote speech training session, a list of contextually valid phrases in the speech recognition system can be presented to the user. Contextually valid phrases can include those phrases in a finite state grammar system which would have been valid phrases at the time of the misrecognition. For example, in a speech-enabled word processing system, while editing a document, a valid phrase could include, "Close Document". By comparison, in the same word processing system, prior to opening a document for editing, an invalid phrase could include "Save Document". Hence, if a misrecognition error had been detected prior to opening a document for editing, the phrase "Save Document" would not be included in a list of contextually valid phrases, while the phrase "Open Document" would be included in a list of contextually valid phrases.

Once the list of contextually valid phrases has been presented to the user, the user can select one of the phrases as the phrase actually spoken by the user. Subsequently, a list words can be presented which form the selected phrase. Again, the speaker can select one or more words in the list which represent those words originally spoken by the speaker, but misrecognized by the embedded speech recognition system 110. These words can be processed along with the stored speech audio input and the active language model 430 by the speech training application 420. More particularly, the speech training application 420 can incorporate corrections into acoustic models 430 based on the specified correct words. By modifying the acoustic models 430 during a speech training session, the accuracy of the speech recognition engine 310 of the embedded speech recognition system 110 can increase as fewer misrecognition errors can be encountered during a speech recognition session.

Figure 5A:
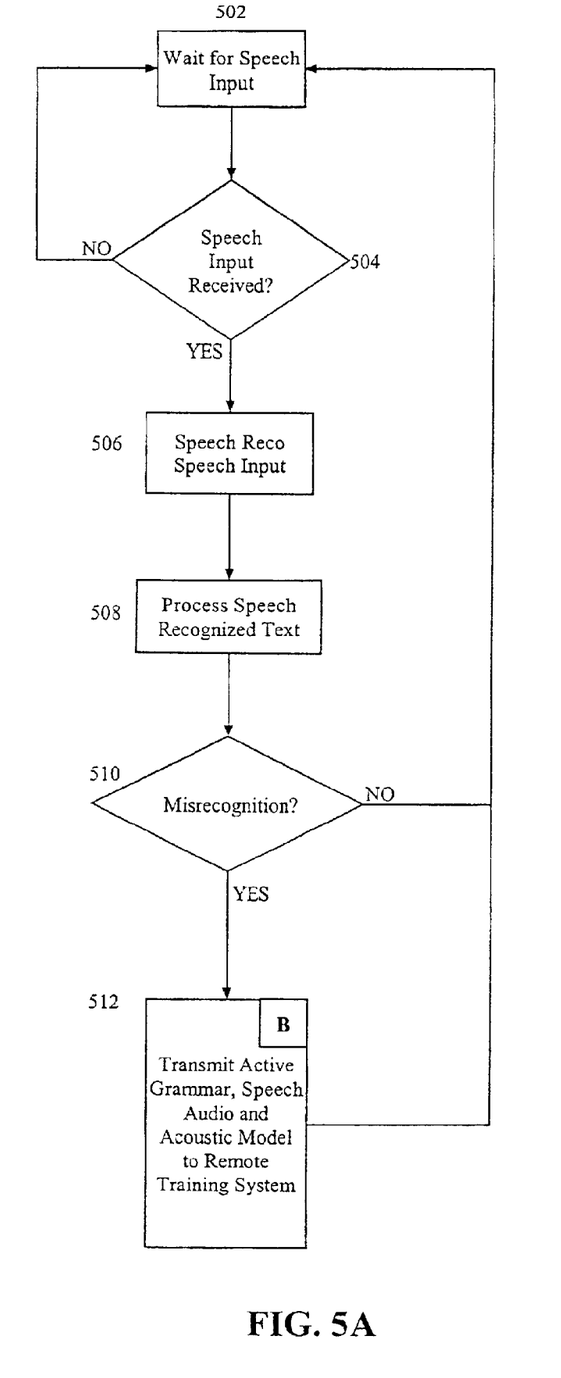
FIGS. 5A–5B, taken together, are a flow chart illustrating a process for detecting misrecognized speech in the embedded speech recognition system of FIG. 1, and processing the misrecognized speech in the remote training system of FIG. 1.

FIG. 5A is a flow chart illustrating a method for processing a misrecognition error in an embedded speech recognition system during a speech recognition session. The method can begin in step 502 in which an embedded speech recognition system can await speech input. In step 504, if speech input is not received, the system can continue to await speech input. Otherwise, in step 506 the received speech input can be speech-to-text converted in a speech recognition engine, thereby producing speech recognized text. In step 508, the speech recognized text can be presented through a user interface such as a visual or AUI. Subsequently, in step 510 if an error notification is not received, such notification indicating that a misrecognition has been identified, it can be assumed that the speech recognition engine correctly recognized the speech input. As such, the method can return to step 502 in which the system can await further speech input. In contrast, if an error notification is received, indicating that a misrecognition has been identified, in step 512 the speech audio input, active acoustic model, and the active language model can be transmitted to the remote speech training system.

Figure 5B:
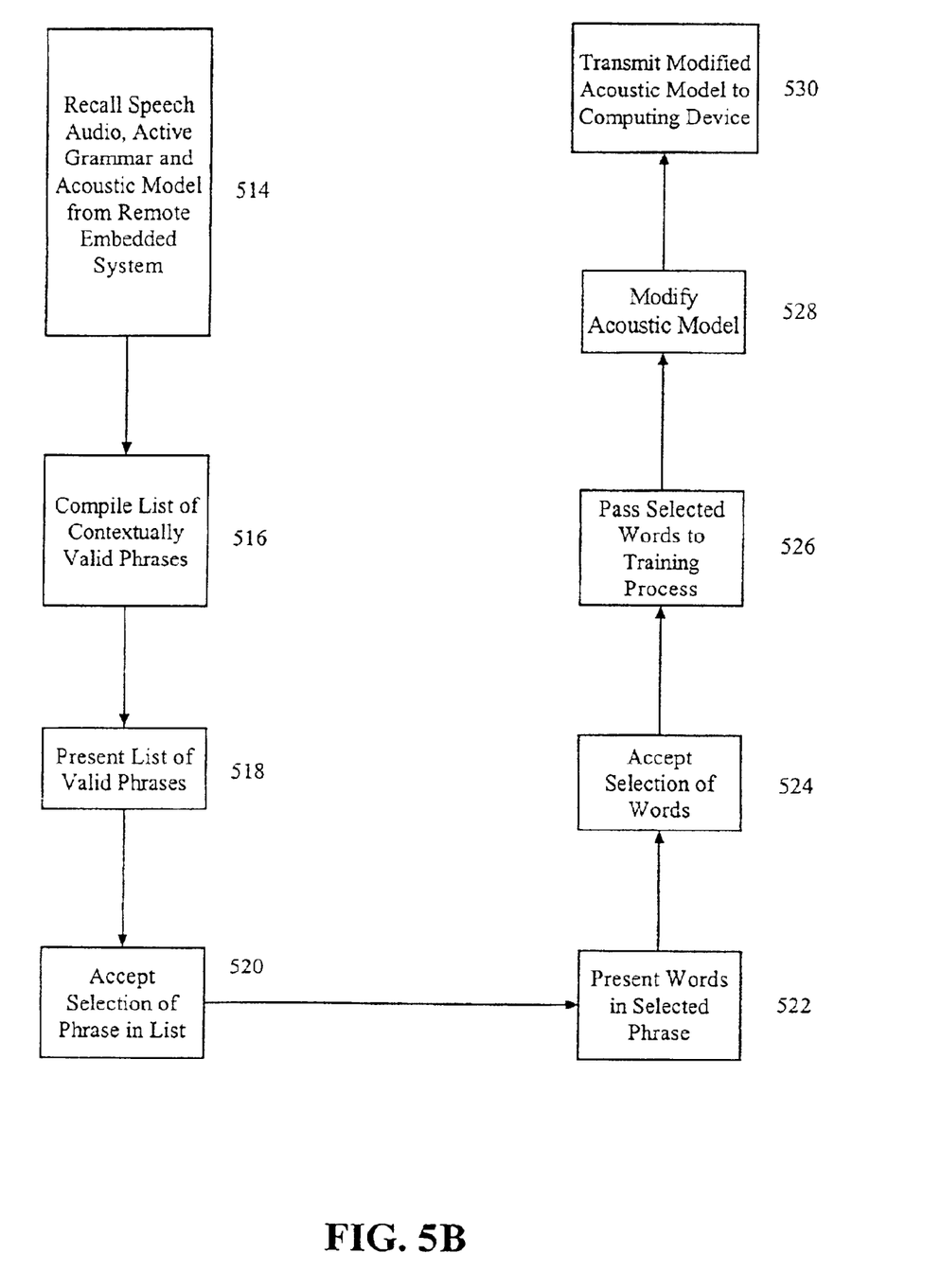

FIG. 5B is a flow chart illustrating a method for performing speech training in a remote speech training system based on a speech misrecognition detected in an embedded speech recognition system. In step 514, each of the speech audio, active acoustic model and active grammar which had been received from the embedded speech recognition system can be recalled for use by the speech training system. Subsequently, in step 516 a list of contextually valid phrases can be compiled indicating those phrases which would be considered valid speech input at the time of the misrecognition. Additionally, in step 518 the list can be presented through a user interface.

In step 520, a phrase can be selected from among the phrases in the list. Then, in step 522, the words forming the selected phrase can be presented in a list of words through the user interface. In step 524, one or more of the words can be selected, thereby indicating those words which had been misrecognized by the speech recognition engine. Thereafter, in step 526 the selected words can be passed to a speech training process. Also, in step 526 the original speech audio input and active grammar can be provided to the speech training process. In consequence, in step 528, the speech training process can modify the acoustic model in order to improve future recognition accuracy. Finally, in step 530, the modified acoustic model can be transmitted back to the embedded speech recognition system.

Notably, the present invention can be realized in hardware, software, or a combination of hardware and software. The method of the present invention can be realized in a centralized fashion in one computer system, or in a distributed fashion where different elements are spread across several interconnected computer systems. Any kind of computer system or other apparatus adapted for carrying out the methods described herein is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which when loaded in a computer system is able to carry out these methods. Computer program means or computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the foregoing specification illustrates and describes the preferred embodiments of this invention, it is to be understood that the invention is not limited to the precise construction herein disclosed. The invention can be embodied in other specific forms without departing from the spirit or essential attributes. Accordingly, reference should be made to the following claims, rather than to the foregoing specification, as indicating the scope of the invention.

I claim:

1. In a remote training system, a method for processing a speech misrecognition generated when converting speech audio to text in an embedded speech recognition system comprising:

locally speech recognizing speech audio within an embedded speech recognition system using an active acoustic model;

presenting a result from the speech recognizing step upon the embedded device;

responsive to the presenting of the result, detecting a speech misrecognition based upon user input;

a remote training system receiving from the embedded speech recognition system an indication of the detected speech misrecognition and the active acoustic model both associated with the detected speech misrecognition in said embedded speech recognition system;

the remote training system, first presenting a list of valid phrases which were contextually valid when the speech misrecognition occurred, and second presenting a list of words forming a selected one of said first presented contextually valid phrases;

the remote training system, modifying said active acoustic model based on selected ones of said words in said list and said indication; and, transmitting said modified acoustic model from the remote training system to said embedded speech recognition system, wherein the embedded speech recognition system utilizes the modified acoustic model to locally speech recognize utterances.

2. The method of claim 1, further comprising receiving an active grammar from said embedded speech recognition system, wherein said active acoustic model is modified based on said active grammar in addition to said selected words and said received speech audio.

3. The method of claim 1, wherein said first presenting step comprises visually presenting said list of contextually valid phrases in a user interface.

4. The method of claim 3, wherein said first presenting step further comprises audibly presenting said list of contextually valid phrases.

5. The method of claim 1, wherein said first presenting step comprises audibly presenting said list of contextually valid phrases.

6. The method of claim 5, wherein said step of audibly presenting said list comprises:

text-to-speech (TTS) converting said list of contextually valid phrases; and, audibly presenting said TTS converted list.

7. A machine readable storage, having stored thereon a computer program for processing a speech misrecognition generated when converting speech audio to text in an embedded speech recognition system, said computer program having a plurality of code sections executable by a machine for causing the machine to perform the steps of:

locally speech recognizing speech audio within an embedded speech recognition system using an active acoustic model;

presenting a result from the speech recognizing step upon the embedded device;

responsive to the presenting of the result, detecting a speech misrecognition based upon user input;

a remote training system receiving from the embedded speech recognition system an indication of the detected speech misrecognition and the active acoustic model both associated with the detected speech misrecognition in said embedded speech recognition system;

the remote training system, first presenting a list of valid phrases which were contextually valid when the speech misrecognition occurred, and second presenting a list of words forming a selected one of said first presented contextually valid phrases;

the remote training system, modifying said active acoustic model based on selected ones of said words in said list and said indication; and, transmitting said modified acoustic model from the remote training system to said embedded speech recognition system, wherein the embedded speech recognition system utilizes the modified acoustic model to locally speech recognize utterances.

8. The machine readable storage of claim 7, further comprising receiving an active grammar from said embedded speech recognition system, wherein said active acoustic model is modified based on said active grammar in addition to said selected words and said received speech audio.

9. The machine readable storage of claim 7, wherein said first presenting step comprises visually presenting said list of contextually valid phrases in a user interface.

10. The machine readable storage of claim 9, wherein said first presenting step further comprises audibly presenting said list of contextually valid phrases.

11. The machine readable storage of claim 7, wherein said first presenting step comprises audibly presenting said list of contextually valid phrases.

12. The machine readable storage of claim 10, wherein said step of audibly presenting said list comprises:
   text-to-speech (TTS) converting said list of contextually valid phrases; and,
   audibly presenting said TTS converted list.

13. A system for processing speech misrecognitions comprising:
   an embedded speech recognition system comprising at least one acoustic model and at least one active grammar, said embedded speech recognition system configured to locally convert speech audio provided by a system user to text using said at least one acoustic model and said at least one active grammar, wherein functions that convert the speech audio for the embedded speech recognition system are bound within specific hardware, and wherein the specific hardware is not designed to be re-purposed by a system user;
   a remote training system configured to receive a digitally encoded signal of the at least one acoustic model and corrections of speech misrecognition from the embedded speech recognition system, to modify said at least one acoustic model based on the corrections, and to convey the modified at least one acoustic model to the embedded speech recognition system; and,
   a communications link for communicatively linking said embedded speech recognition system to said remote training system.

14. The system of claim 13, wherein said remote training system further comprises a user interface for presenting a dialog for correcting said speech misrecognitions detected an said embedded speech recognition system.

15. The system of claim 14, wherein said user interface is a visual display.

16. The system of claim 14, wherein said user interface is an audio user interface.

17. The system of claim 15, wherein said user interface further comprises an audio user interface.

\* \* \* \* \*